(12) United States Patent
Anghileri

(10) Patent No.: US 11,432,553 B2
(45) Date of Patent: Sep. 6, 2022

(54) BAKING PAN WITH BAKING MOLDS FOR FOOD PRODUCTS

(71) Applicant: NOVACART S.P.A., Garbagnate Monastero (IT)

(72) Inventor: Gianmario Anghileri, Malgrate (IT)

(73) Assignee: NOVACART S.P.A., Garbagnate Monastero (IT)

(*) Notice: Subject to any disclaimer, the term of this patent is extended or adjusted under 35 U.S.C. 154(b) by 318 days.

(21) Appl. No.: 16/762,083

(22) PCT Filed: Nov. 7, 2018

(86) PCT No.: PCT/IB2018/058745
§ 371 (c)(1),
(2) Date: May 6, 2020

(87) PCT Pub. No.: WO2019/092611
PCT Pub. Date: May 16, 2019

(65) Prior Publication Data
US 2020/0337317 A1 Oct. 29, 2020

(30) Foreign Application Priority Data
Nov. 7, 2017 (IT) .................. 102017000126638

(51) Int. Cl.
*A21B 3/13* (2006.01)
(52) U.S. Cl.
CPC .............. *A21B 3/131* (2013.01); *A21B 3/132* (2013.01)
(58) Field of Classification Search
CPC ................................ A21B 3/131; A21B 3/132
See application file for complete search history.

(56) References Cited

U.S. PATENT DOCUMENTS

| 258,511 A | 5/1882 | Vuillier |
| 2005/0199131 A1 | 9/2005 | Meeks et al. |
| 2007/0108089 A1 | 5/2007 | Galluch |

FOREIGN PATENT DOCUMENTS

| JP | S48 111571 U | 12/1973 |
| JP | H05 42928 A | 2/1993 |

(Continued)

OTHER PUBLICATIONS

International Search Report and Written Opinion dated Feb. 20, 2019 for International Application No. PCT/IB2018/058745 (16 pages).

*Primary Examiner* — James Sanders
(74) *Attorney, Agent, or Firm* — MH2 Technology Law Group LLP

(57) ABSTRACT

The present invention relates to a baking pan (1) for cooking food products in the oven, comprising a plurality of containment structures (3) exhibiting a bottom portion (4), a top portion (5) delimiting an insertion opening (6) and a lateral portion (7) emerging from the bottom portion (4) and connected to the top portion (5). The containment structure (3) is made integrally from a same paper sheet material; a container (8) made of paper sheet material is housed in the containment structure (3) and has a base (9), a lateral wall (10) emerging away from the base (9) and an upper edge (20) emerging from the lateral wall (10); also the container (8) is integrally made starting from a same paper sheet material. The container (8) is coupled to the top portion (5) of the containment structure (3) and the lateral portion (7) of the containment structure (3) comprises a plurality of ribs (7a) extending from the bottom portion (4) and joined to the top portion (5) for defining a lateral area of the containment structure (3) exhibiting through openings alternated by ribs (7a).

19 Claims, 6 Drawing Sheets

(56) References Cited

FOREIGN PATENT DOCUMENTS

| | | |
|---|---|---|
| JP | 2007197090 A | 8/2007 |
| JP | 2012 116540 A | 6/2012 |

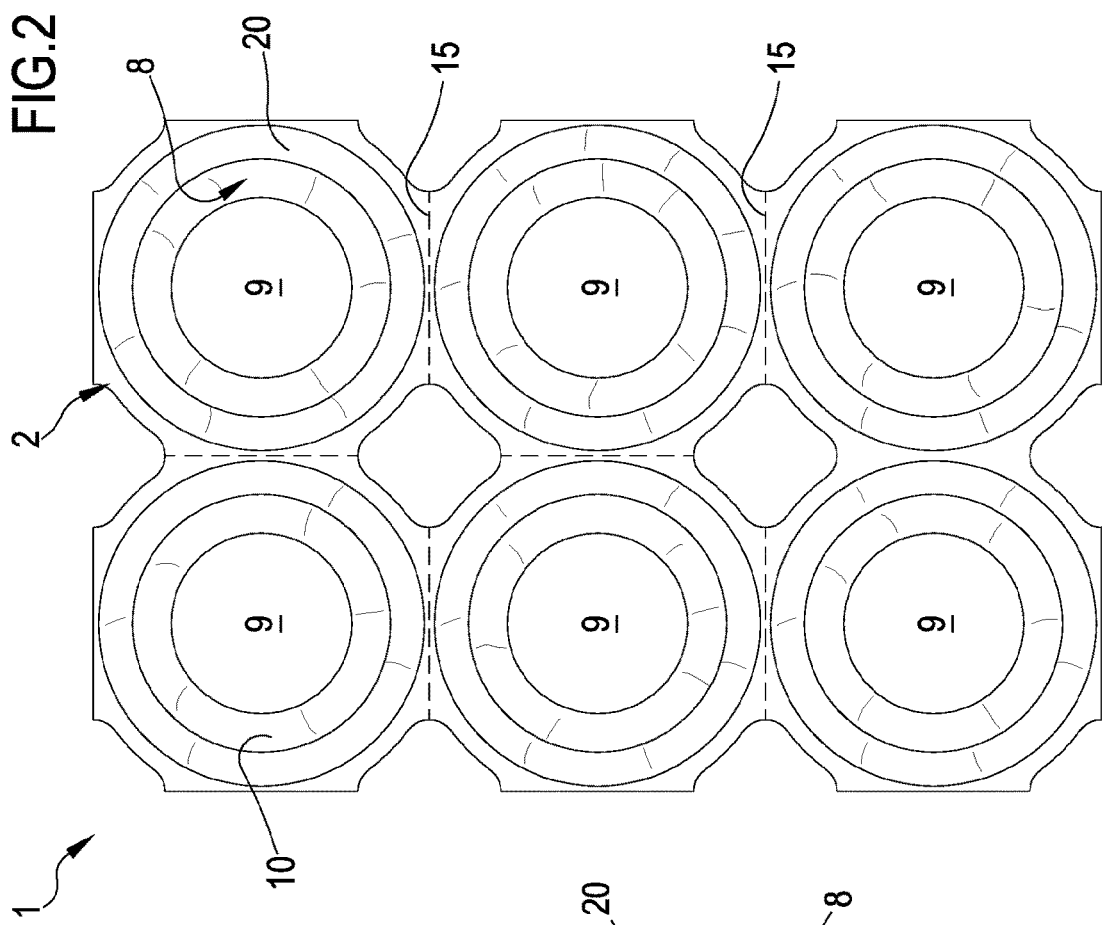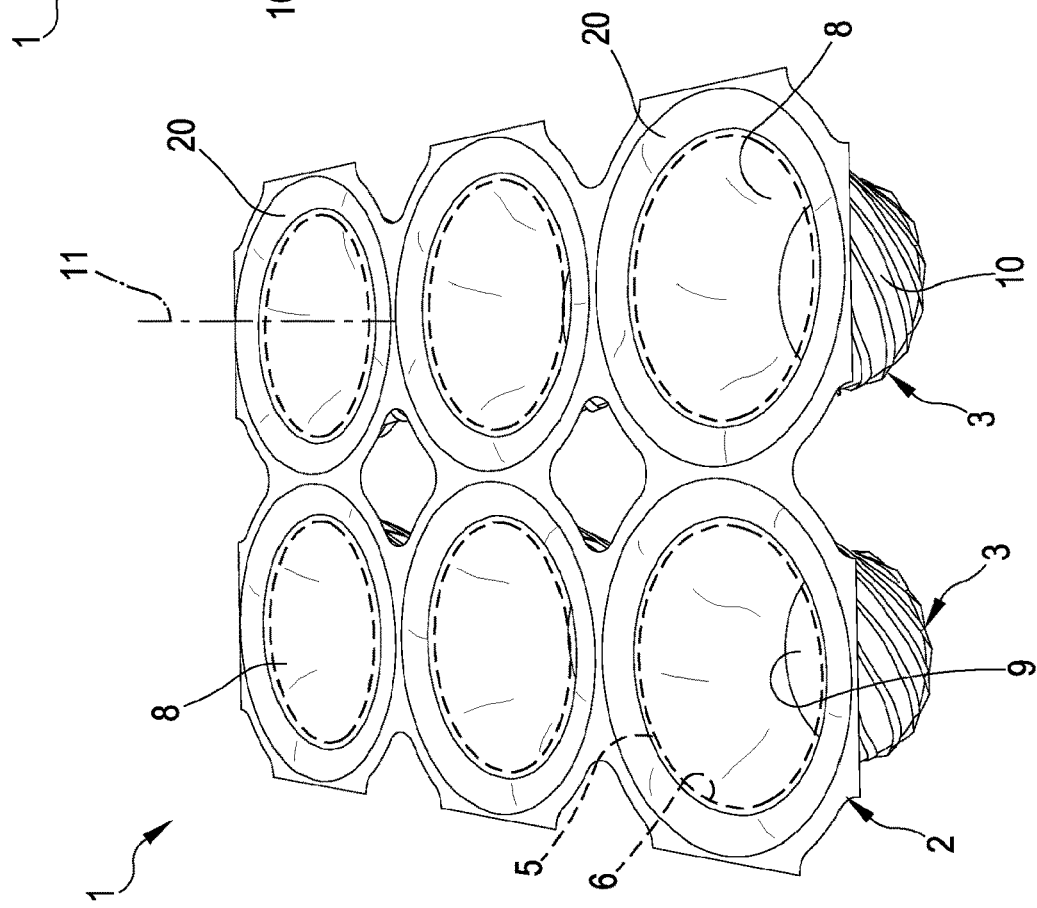

FIG.4A
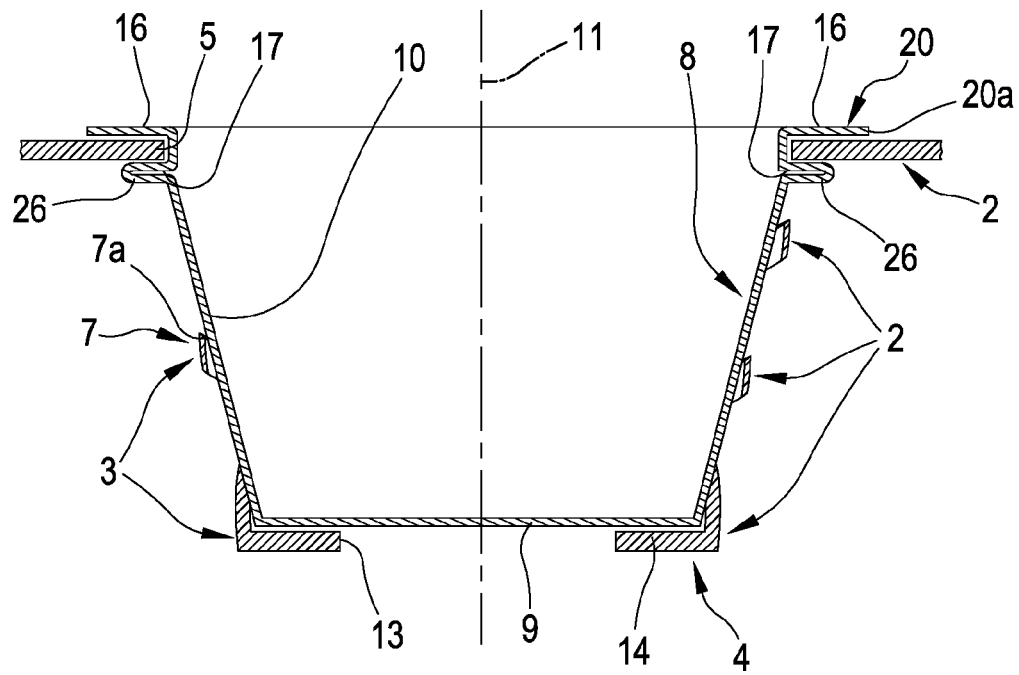
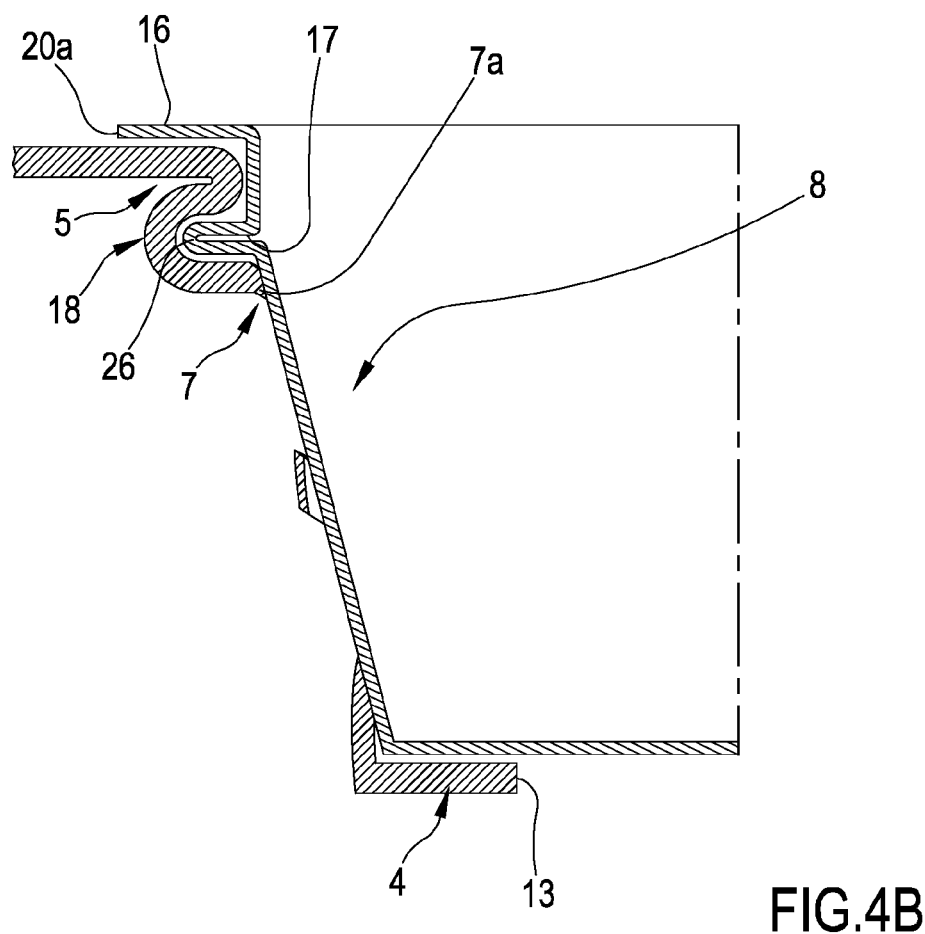
FIG.4B

FIG.6
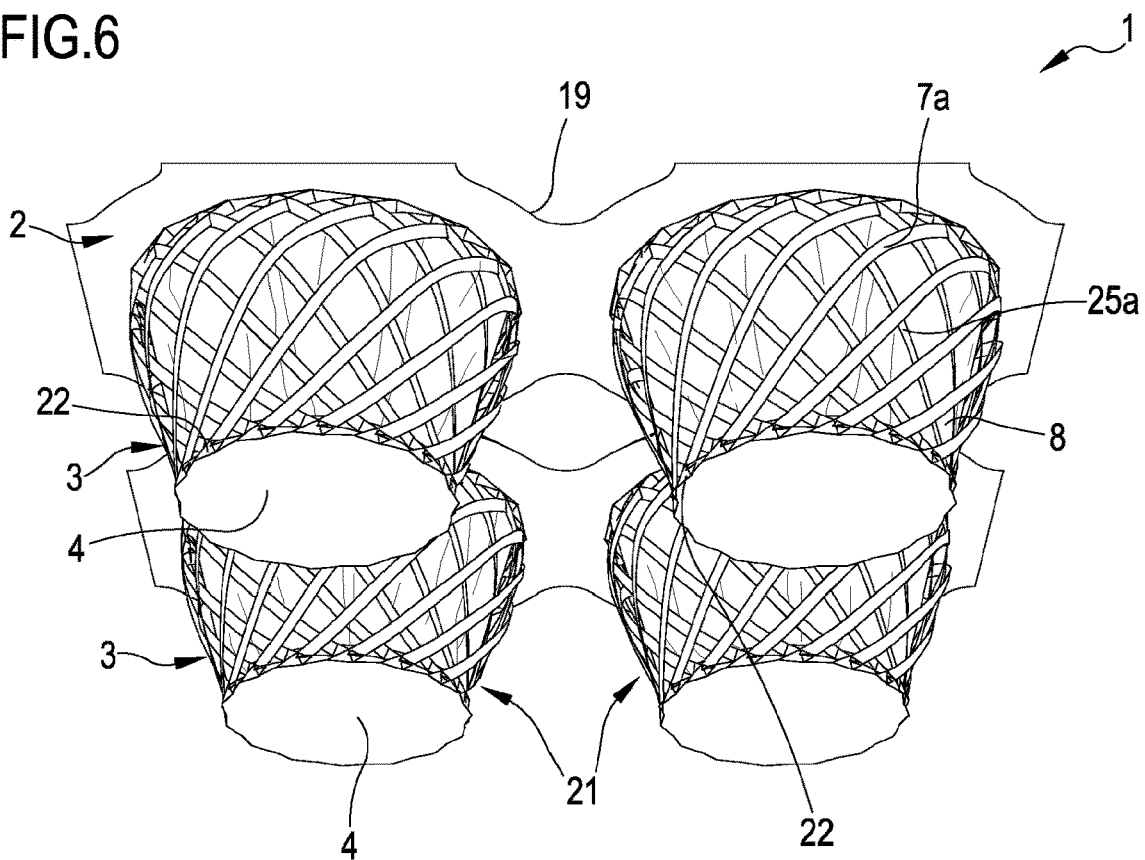
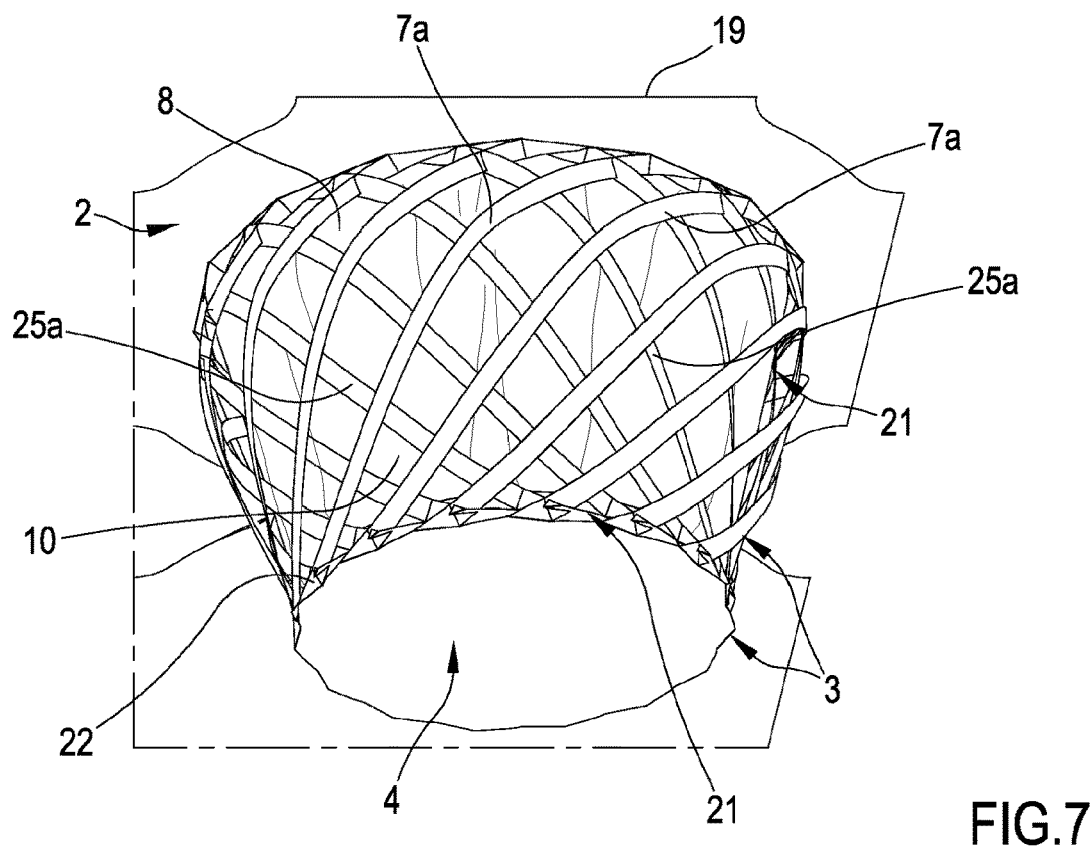
FIG.7

BAKING PAN WITH BAKING MOLDS FOR FOOD PRODUCTS

CROSS-REFERENCE TO RELATED APPLICATIONS

This application is a U.S. National Stage application of PCT/IB1320181/058745 filed Nov. 7, 2018, which claims priority to Italian Patent Application No. 102017000126638 filed Nov. 7, 2017, the entire disclosure of which is hereby incorporated by reference in its entirety.

FIELD OF THE INVENTION

The present invention relates to a baking pan which receives one or more baking molds for food products for the oven. In particular, the baking pan object of the invention is designed to support a predetermined number of containers inside which the dough of the product to be baked in the oven is poured. Once baked, the pan supports the containers with the respective products therein in order to allow the packaging and easy transport thereof to the distribution and/or sales points. The baking pan is particularly suitable for cooking and transporting confectionery products such as muffins and small cakes, but also cakes and larger-sized products.

BACKGROUND

As is known, the baking of cakes generally involves the use of baking pans which are suitable for containing a certain quantity thereof to allow simultaneous introduction and extraction from a cooking oven. In this regard, different types of baking pans are currently used. A first type of baking pan exhibits a laminar structure of metal material in which a plurality of recesses are provided, each adapted to contain a sweet. Document U.S. Pat. No. 258,511 also describes a flat laminar support which is engaged to a plurality of containers which are constrained to the flat laminar support by suitable bending of the upper edge of the containers. It is noted that the baking pans of this type, in addition to having high manufacturing costs, entail long times for the production of sweets and therefore high costs caused by a greater consumption of heat. In fact, it should be noted that these involve the extraction of the sweets from the respective recesses as soon as they are baked, and subsequently the packaging thereof to allow their distribution to retailers or consumers. Another drawback exhibited by the baking pans specified above is that they also require careful maintenance, as they must be periodically washed and sterilized. It is also noted that these baking pans cannot be used to cook sweets in modern microwave ovens, due to unwanted reflections of waves that they can generate inside the ovens themselves. Baking pans are also known which are made of plastic material but substantially identical, as regards the construction concept, to the previously described pans. In fact, they have lower construction costs than those of metal pans, but are also subject to all the other drawbacks specified above. It is evident that in this situation it would be advisable to have baking pans that are capable of allowing a significant reduction in the operations and times necessary to obtain the finished product. In this regard, the Applicant has developed a particular type of container for sweets, which has been the subject of Italian patent application no. 230408/82 filed on behalf of the same Applicant. This patent application relates to a container for cakes made substantially from a laminar support in paper material in which, by means of through holes, a plurality of seats is provided, each of which houses a small baking cup designed to contain a sweet. By the term "baking cup", the man skilled in the art means a container of pleated paper, substantially truncated conical or frusto-conical in shape open upwardly. The containers of this type have proved advantageously suitable for being used as baking pans for cakes, as well as being directly packaged, once baked, with the sweets themselves to form a finished package. By means of the same, all the other drawbacks specified with reference to the metal and plastic pans can also be eliminated. In fact, they have extremely low production costs, do not require maintenance operations, as they are used only once, and do not cause problems if they are used in microwave ovens. However, it has been found that they are not adapted to be transported by automated transport facilities serving modern-purpose ovens and packaging devices. It should also be noted that such containers only make the introduction in the oven and the packaging of predetermined quantities of sweets during manufacture convenient, as they cannot be easily divided into portions adapted to contain a number of sweets different from the aforementioned. Document JP2007197090A describes a basket structure consisting of a first and a second series of inverse ribbed baskets inserted one inside the other to form a three-dimensional support. Alongside the solution described above, the Applicant has also developed an embodiment according to patent EP544973, in which a pan-like structure accommodates a plurality of paper containers coupled to the support. In particular, each container or baking cup has the respective upper edge turned on the support at the edge of the respective through hole, and is fixed there by means of glue. In a further embodiment, on the other hand, a second example is shown in which each baking cup exhibits, at the upper edge thereof, an interlocking portion formed by a series of consecutive folded segments extending circumferentially and substantially according to overlapping horizontal planes. In this case, the cup is detachably engaged to the support at the respective through hole by interposing the edge of the latter between two consecutive folded segments. In this situation, it is advantageously possible to separate the baking cup from the support to make it easier to consume the cake sweet contained therein. More precisely, the baking cup, both in the packaging step and during the consumption step, can be removed from the seat obtained in the support. Thereafter, by exerting a pulling action on the outer edge of the baking cup, the sweet can be easily released for consumption. Also this solution, although having significantly improved the prior art, is not without drawbacks. First of all, the structural strength of the pan-like structure is linked to the resistance and to the stress and strain of the material of which the individual containers are made. In order to maintain a sufficient shape retention, the weight of the material as well as the presence of coating films of the baking cups, appear essential features and they necessarily increase production costs. Moreover, as understandable, the automatic handling of the pan appears strictly linked to the shape retention and to the repeatability of the structure geometry during the production step. This problem is related to that previously illustrated. Finally, document JP2012116540A describes two paper containers (or baking cups) inserted one into the other and coupled by means of suitable opposed tabs of the bottom container inserted in corresponding slots in the lateral wall of the inner container. The object of the present invention is to eliminate the aforementioned drawbacks with a baking pan which, conceptually based on the above sweet containers, offers the possibility of being easily transported by means of automatic transport means. A further object is to provide a baking pan which can take advantage of containers made of paper material of lower weights and possibly free of film or with further reduced film thicknesses, without the structure losing its mechanical resistance or the handling thereof being compromised. An auxiliary object is also that of managing the flow of heat to the various portions of the container by shape modifications, by screening more or less certain areas during oven baking. A secondary object is to provide a baking pan which can be easily divided into several parts. Another object of the invention is to ensure that the fractioning of a baking pan of certain dimensions does not compromise the possibility of transporting it by means of the aforementioned automatic means. These and other objects, which will become better apparent in the course of the present description, are substantially achieved by a baking pan structure for cooking and distributing sweets and food in general, of the type according to the appended claims.

SUMMARY OF THE INVENTION

Aspects of the invention are described hereinafter.

In a 1st aspect, a pan (1) is provided for cooking food products in the oven, comprising:
- a support (2) of paper sheet material having:
  - at least one containment structure (3) exhibiting a bottom portion (4), a top portion (5) delimiting an inserting opening (6) and a lateral portion (7) emerging from the bottom portion (4) and connected to the top portion (5), said containment structure (3) being integrally made from a same paper sheet material, the bottom portion (4), the top portion (5) and lateral portion (7) being integrally seamlessly made,
  - at least one container (8) of a paper sheet material housed in the containment structure (3), the container (8) exhibiting a base (9), a lateral wall (10) emerging away from the base (9) and an upper edge (20) emerging from the lateral wall (10), the container (8) being integrally made from a same paper sheet material, the base (9), the lateral wall (10) and the upper edge (20) being integrally seamlessly made,
  - wherein the base (9) of the container (8) is substantially in contact or in proximity with the bottom portion (4) of the containment structure (3), the lateral wall (10) of the container (8) is substantially in contact or in proximity with the lateral portion (7) of the containment structure (3), the upper edge (20) of the container (8) is substantially in contact or in proximity with the top portion (5) of the containment structure (3).

In a 2nd aspect according to the preceding aspect, the container (8) is coupled to the top portion (5) of the containment structure (3) and the lateral portion (7) of the containment structure (3) comprises a plurality of ribs (7a) extending from the bottom portion (4) and joined to the top portion (5) for defining a lateral area of the containment structure (3) exhibiting through openings alternated by ribs (7a).

In one aspect according to the preceding, each rib (7a) is alternated with a through opening, in particular ribs (7a) and through openings are arranged in a substantially uniform manner along an entire development of the lateral portion (7).

In a 3rd aspect according to any one of the preceding aspects, a method is provided for making a baking pan for cooking food products in an oven comprising the following steps:

- providing a support (2) of a flat paper sheet material exhibiting curvilinear through cuts (12) from a peripheral area towards a central area of the flat paper sheet material, the curvilinear through cuts (12) defining a plurality of curvilinear segments substantially parallel to each other having a clockwise or anticlockwise pattern with respect to an axis (11) normal to the support, said curvilinear through cuts (12) being placed around a central area;
- deforming the support (2) at the curvilinear through cuts (12), particularly by a relative rotation of the central area, for defining at least one containment structure (3) exhibiting a bottom portion (4), a top portion (5) delimiting an insertion opening (6) and a lateral portion (7) emerging from the bottom portion (4) and connected to the top portion (5),
- deforming a flat paper sheet material for defining at least one container (8) of paper sheet material, the container (8) exhibiting a base (9), a lateral wall (10) emerging away from the base (9) and an upper edge (20) emerging from the lateral wall (10),
- housing the container (8) in the containment structure (3) so that the base (9) of the container (8) is substantially in contact or in proximity with the bottom portion (4) of the containment structure (3), the lateral wall (10) of the container (8) is substantially in contact or in proximity with the lateral portion (7) of the containment structure (3), the upper edge (20) of the container (8) is substantially in contact or in proximity with the top portion (5) of the containment structure (3), In one aspect according to any one of the preceding aspects, the top portion (5) emerges transversely from the lateral portion (7) and lies in a plane substantially parallel to a plane which contains the bottom portion (4). In one aspect according to the preceding aspect, the top portion (5) defines a top support plane, the lateral portion (7) and the bottom portion (4) of the containment structure (3), as well as the base (9) and the lateral wall (10) of the container (8) developing below the top portion under conditions of use of the baking pan.

In one aspect according to any one of the preceding aspect, each of the plurality of ribs (7a) emerges from the bottom portion (4) and extends in an arched pattern up to the top portion (5).

In one aspect according to any one of the preceding aspects, each rib (7a) emerges from a point of the bottom portion (4) and develops in an arched pattern up to a point of the top portion (5) angularly offset with respect to said point of the bottom portion (4), in particular the bottom portion (4) is substantially circular and the insertion opening (6) delimited by the top portion (5) is substantially circular.

In one aspect according to any one of the preceding aspects, the container (8) has no openings at the lateral wall (10) and the base (9), in particular the container (8) is adapted to contain food mixes, even semi-liquids for a the subsequent cooking thereof.

In one aspect according to any one of the preceding aspects, wherein which the top portion (5) defines a continuous seamless edge surrounding the insertion opening (6), said continuous edge being substantially circular and developing in a plane.

In a 4th aspect according to any one of the preceding aspects, it is provided to join the container (8) to the top portion (5) of the containment structure (3).

In one aspect according to the preceding one, the coupling is a mechanical interference coupling between the container (8) and the top portion (5) of the containment structure (3), in particular between the top portion (5) and the upper edge (20).

In a 5th aspect according to any one of the preceding aspects, wherein the deformation step of the support comprises relatively rotating the top portion (5) and the bottom portion (4) about the axis (11) according to a direction opposite to the pattern of the curvilinear segments determining a departure of the bottom portion (4) from the top portion (5) in a direction parallel to the axis (11) and a simultaneous arrangement of the material interposed between the through cuts (12) in a three-dimensional configuration to define ribs (7a).

In a 6th aspect according to any one of the preceding aspects, the step of coupling the container (8) to the containment structure (3) comprises, after having housed the container (8) in the containment structure (3), reducing by means of relative crushing a distance between the upper edge (20) and the bottom portion (4) of the container so that a part of the lateral wall (10) deforms outwardly of a containment compartment of the container (8) below the top portion (5).

In a 7th aspect according to any one of the preceding aspects, the coupling step also comprises pressing the part of the deformed lateral wall (10) against the top portion (5) for defining an interference fit between the container (8) and the support structure (3).

In an 8th aspect according to any one of the preceding aspects, the step of reducing by crushing and the pressing step defines on the container (8) a first segment (16) and a second segment (17) consecutive to each other and transversal, in particular substantially parallel to the top portion (5) of the containment structure (3).

In a 9th aspect according to any one of the preceding aspects, the first segment (16) is placed above the top portion (5) of the containment structure (3), the second segment (17) is placed below the top portion (5) of the containment structure (3) oppositely to the first segment (16) for defining a stable interference fit between the container (8) and the containment structure (3).

In a 10th aspect according to any one of the preceding aspects, the upper edge (20) of the container (8) comprises the first transversal segment (16), particularly substantially parallel, to the top portion (5) of the containment structure (3) and the lateral wall (10) of the container (8) comprises a second transversal segment (17), particularly substantially parallel, to the top portion (5) of the containment structure (3).

In an 11th aspect according to the preceding aspect, said segments (16, 17) being consecutive to each other, the first segment (16) being placed above the top portion (5) of the containment structure (3), the second segment (17) being placed below the top portion (5) of the containment structure (3) oppositely with respect to the first segment (16) so as to define a stable interference fit between the container (8) and the containment structure (3).

In a 12th aspect according to any one of the preceding aspects, the reducing by crushing step and the pressing step define, in a section according to a vertical plane under conditions of normal use of the baking pan, the first segment (16) and the second segment (17) with a substantially U-shaped pattern inside which the top portion (5) of the containment structure is housed and retained (3)

In a 13th aspect according to any one of the preceding aspects, the upper edge (20) and/or the lateral wall (10) of the container (8) comprises a third segment (26) consecutive to the second segment (17) oppositely to the first segment (16), said third segment being transversal, in particular substantially parallel, to the top portion (5) of the containment structure (3), in particular the lateral wall (10) of the container (8) comprising said third segment (26).

In a 14th aspect according to any one of the preceding aspects, the reducing by crushing step and the pressing step define an upper segment (18) of each rib (7a) flattened towards the top portion (5).

In a 15th aspect according to any one of the preceding aspects, the containment structure (3) is formed by deformation starting from a sheet of flat paper material.

In a 16th aspect according to any one of the preceding aspects, the containment structure (3) is formed by deformation starting from a flat paper material sheet having one or more curvilinear through cuts (12) starting from a peripheral area towards a central area of flat paper material sheet.

In a 17th aspect according to any one of the preceding aspects, the curvilinear through cuts (12) define a plurality of curvilinear segments substantially parallel to each other with clockwise or anticlockwise pattern around an axis (11) normal to a development of the bottom portion (4).

In an 18th aspect according to any one of the preceding aspects, a relative rotation between the top portion (5) and the bottom portion (4) about the axis (11) according to a direction opposite to that of the pattern of the curvilinear segments causes a departure of the bottom portion (4) from the top portion (5) in a direction parallel to the axis (11).

In a 19th aspect according to any one of the preceding aspects, a relative rotation between the top portion (5) and the bottom portion (4) about the axis (11) according to a direction opposite to the pattern of the curvilinear segments determines a departure of the bottom portion (4) from the top portion (5) in a direction parallel to the axis (11) and a simultaneous arrangement of the material interposed between the through cuts (12) in a three-dimensional configuration to define the ribs (7a).

In a 20th aspect according to any one of the preceding aspects, each through cut (12) defines a cut distinct and separated from the one of the other cuts (12) extending between a constraint end (12a) and a bottom end (12b) with an angular expansion greater than 15°, particularly greater than 45°, even more particularly greater than 90°.

In a 21st aspect according to any one of the preceding aspects, each through cut (12) substantially defines or approximates a circumferential arc.

In a 22nd aspect according to any one of the preceding aspects, the extension of the through cuts (12) defines the length of the ribs (7a) and consequently is proportional to a distance between the bottom portion (4) and the top portion (5).

In a 23rd aspect according to any of the preceding aspects, the containment structure (3), when decoupled from the container (8), can be configured between a three-dimensional condition in which the bottom portion (4) is spaced from the top portion (5) and a flat condition in which the bottom portion (4) is substantially aligned with the top portion (5), in particular the container (8) being able to be coupled to the containment structure when the latter is in the three-dimensional condition.

In a 24th aspect according to any one of the preceding aspects, the containment structure (8) may be configured between a three-dimensional condition and the flat condition by means of a relative rotation between the top portion (5) and the bottom portion (4) around an axis (11) normal to a development of the bottom portion (4).

In a 25th aspect according to any one of the preceding aspects, the bottom portion (4) is not constrained to the base (9) of the container (8), the bottom portion (4) and the base (9) being capable of rotating with respect to each other.

In a 26th aspect according to any one of the preceding aspects, the bottom portion (4) has a central hole (13) which allows access to the base (9) of the container (8).

In a 27th aspect according to any one of the preceding aspects, the bottom portion (4) comprises at least one continuous annular band (14) around the central hole (13).

In a 28th aspect according to the preceding aspect, all the ribs (7a) of the lateral portion (7) being integrally joined with the continuous annular band (14).

In a 29th aspect according to any one of the preceding aspects, the support (2) made of paper material sheet comprises a plurality of containment structures (3).

In a 30th aspect according to any one of the preceding aspects, the plurality of containment structures (3) is integrally made from a same flat paper material sheet.

In a 31st aspect according to any one of the preceding aspects, the support (2) made of paper material sheet is made in one piece starting from a same flat paper material sheet, the containment structure being made of the same flat paper material sheet.

In a 32nd aspect according to any one of the preceding aspects, the ribs are at least 4, in particular at least 6 and even more particularly at least 8.

In a 33rd aspect according to any one of the preceding aspects, the support (2) is a paper sheet material with a grammage greater than a grammage of the sheet material constituting the container (8).

In a 34th aspect according to any one of the preceding aspects, the support (2) is made of cardboard, in particular with a grammage of between 151 and 400 grams per m$^2$.

In a 35th aspect according to any one of the preceding aspects, the support (2) comprises a predetermined number of weakening lines (15) configured to allow a separation of portions of the support from each other, in particular each portion comprising one or more, in particular only one, containment structures (3).

In a 36th aspect according to any one of the preceding aspects, the container (8) is removably coupled to the top portion (5) of the containment structure (3).

In a 37th aspect according to any one of the preceding aspects, the upper edge (20) and/or the lateral wall (10) of the container (8) are coupled, in particular removably, to the top portion (5) of the containment structure (3).

In a 38th aspect according to any one of the preceding aspects, the upper edge 20 and/or the lateral wall 10 of the container 8 comprise a first segment 16 and a second segment 17 which are consecutive and transversal, in particular substantially parallel, to the top portion 5 of the containment structure 3, the first segment (16) being placed above the top portion (5) of the containment structure (3), the second segment (17) being placed below the top portion (5) of the containment structure (3) oppositely to the first segment (16) for defining a stable interference fit between the container (8) and the containment structure (3).

In a 39th aspect according to any one of the preceding aspects, the upper edge (20) of the container (8) comprises a first segment (16) transversal, particularly substantially parallel, to the top portion (5) of the containment structure (3).

In a 40th aspect according to any one of the preceding aspects, the lateral wall (10) of the container (8) comprises a second section (17) transversal, particularly substantially parallel, to the top portion (5) of the containment structure (3).

In an 41st aspect according to the preceding aspect, said segments (16, 17) are consecutive to each other, the first segment (16) is placed above the top portion (5) of the containment structure (3), the second segment (17) is placed below the top portion (5) of the containment structure (3) oppositely with respect to the first segment (16) so as to define a stable interference fit between the container (8) and the containment structure (3).

In a 42nd aspect according to any one of the preceding aspects, in a section according to a vertical plane under conditions of normal use of the baking pan, the first segment (16) and the second segment (17) define a substantially U-shaped pattern inside which the top portion (5) of the containment structure is housed and retained (3)

In a 43rd aspect according to any one of the preceding aspects, the upper edge (20) and/or the lateral wall (10) of the container (8) comprises a third segment (26) consecutive to the second segment (17) oppositely to the first segment (16), said third segment being transversal, in particular substantially parallel, to the top portion (5) of the containment structure (3), in particular the lateral wall (10) of the container (8) comprising said third segment (26).

In a 44th aspect according to any one of the preceding aspects, the first segment (16) emerges directly from a free edge (20a) of the upper edge (20) and is located above the top portion (5) oppositely to the bottom portion (4).

In a 45th aspect according to any one of the preceding aspects, an upper segment (18) of each rib (7a) is flattened towards the top portion (5).

In a 46th aspect according to any one of the preceding aspects, the container (8) has a substantially circular upper edge (20) and/or wherein the container (8) has a substantially circular base (9).

In a 47th aspect according to any one of the preceding aspects, the container (8) has a continuous lateral wall (10) with a substantially frusto-conical or cylindrical shape.

In a 48th aspect according to any one of the preceding aspects, the lateral wall (10) and/or the continuous base (9) of the container (8) do not exhibit openings and/or interruptions of the structural continuity, in order to contain a dough without leaking it.

In a 49th aspect according to any one of the preceding aspects, the lateral wall (10) of the container (8) is not glued to the lateral portion (7) of the containment structure.

In a 50th aspect according to any one of the preceding aspects, the upper edge (20), and an associated free edge (20a) of the upper edge (20), of the container (8), is disposed above the top portion (5) of the containment structure (3) oppositely to the base (9) with respect to the top portion (5).

In a 51st aspect according to any one of the preceding aspects, the container (8) exhibits at the lateral wall (10) and upper edge (20), surpluses of paper material determined by making the container (8) by folding a flat sheet.

In a 52nd aspect according to any one of the preceding aspects, the surpluses of material are in the form of a substantially regular pleating on the lateral wall (10) and the upper edge (20).

In a 53rd aspect according to any one of the preceding aspects, the surpluses of material are in the form of irregular tri-layered crushed portions on the lateral wall and upper edge or substantially regular pleating combinations and irregular tri-layered crushed portions.

In a 54th aspect according to any one of the preceding aspects, the pan further comprises an auxiliary support (19) made of paper sheet material coupled to the support (2) and having at least one auxiliary containment structure (21) having an auxiliary bottom portion (22), an auxiliary top portion (23) delimiting an auxiliary insertion opening and an auxiliary lateral portion emerging from the auxiliary bottom portion (22) and connecting to the auxiliary top portion.

In a 55th aspect according to the preceding aspect, said auxiliary containment structure (19) is integrally made starting from a same paper material sheet, the auxiliary bottom portion (22), the auxiliary top portion and the auxiliary lateral portion are joined together seamlessly.

In a 56th aspect according to any one of the preceding aspects, the auxiliary lateral portion of the auxiliary containment structure (21) comprises a plurality of ribs (25a) extending from the auxiliary bottom portion (22) and joined to the auxiliary top portion for defining a lateral area of the auxiliary containment structure (21) exhibiting through openings alternated by ribs (25a).

In a 57th aspect according to any one of the preceding aspects, the auxiliary containment structure (21) is inserted inside the containment structure (3) or vice versa.

In a 58th aspect according to any one of the preceding aspects, the auxiliary containment structure (21) is formed by deformation starting from a sheet of flat paper material.

In a 59th aspect according to any one of the preceding aspects, the auxiliary containment structure (21) is formed by deformation starting from a flat paper material sheet having one or more curvilinear through cuts (27) starting from a peripheral area towards a central area of flat paper material sheet.

In a 60th aspect according to any one of the preceding aspects, the curvilinear through cuts (27) define a plurality of curvilinear segments substantially parallel to each other with clockwise or anticlockwise pattern around an axis (11) normal to a development of the auxiliary bottom portion (22).

In a 61st aspect according to any one of the preceding aspects, a relative rotation between the auxiliary top portion (5) and the auxiliary bottom portion (22) about the axis (11) according to a direction opposite to the pattern of the curvilinear segments determines a departure of the auxiliary bottom portion (22) from the auxiliary top portion in a direction parallel to the axis (11) and a simultaneous arrangement of the material interposed between the through cuts (27) in a three-dimensional configuration to define the ribs (25a).

In a 62nd aspect according to any one of the preceding aspects, each through cut (27) defines a cut distinct and separated from the one of the other cuts (27) extending between a constraint end (27a) and a bottom end (27b) with an angular expansion greater than 15°, particularly greater than 45°, even more particularly greater than 90°.

In a 63rd aspect according to any one of the preceding aspects, each through cut (27) substantially defines or approximates a circumferential arc.

In a 64th aspect according to any one of the preceding aspects, the extension of the through cuts (27) defines the length of the ribs (25a) and consequently is proportional to a distance between the bottom portion (22) and the top portion.

In a 65th aspect according to any one of the preceding aspects, the through cuts (27) of the auxiliary support (19) and through cuts (12) of the support (2), when the supports are coupled, define opposing patterns, clockwise and anticlockwise.

In a 66th aspect according to any of the preceding aspects, the auxiliary containment structure (21), when decoupled from the container (8), can be configured between a three-dimensional condition in which the auxiliary bottom portion (22) is spaced from the auxiliary top portion and a flat condition in which the auxiliary bottom portion (22) is substantially aligned with the auxiliary top portion.

In a 67th aspect according to the preceding aspect, the container (8) can be coupled to the containment structure when the latter is in the three-dimensional condition.

In a 68th aspect according to any one of the preceding aspects, the auxiliary containment structure (21) may be configured between a three-dimensional condition and the flat condition by means of a relative rotation between the auxiliary top portion and the auxiliary bottom portion (22) around an axis (11) normal to a development of the auxiliary bottom portion (22).

In a 69th aspect according to any one of the preceding aspects, the auxiliary bottom portion (22) is not constrained to the base (9) of the container (8) and is not constrained to the bottom portion (4) of the containment structure. (3).

In a 70th aspect according to any one of the preceding aspects, the auxiliary bottom portion (4), the bottom portion (4) and the base (9) are capable of rotating with respect to each other.

In a 71st aspect according to any one of the preceding aspects, the auxiliary bottom portion (22) has an auxiliary central hole (13) which allows access to the base (9) of the container (8).

In a 72nd aspect according to any one of the preceding aspects, the auxiliary bottom portion (22) comprises at least one auxiliary annular band around the auxiliary central hole.

In a 73rd aspect according to the preceding aspect, all the ribs (25a) of the auxiliary lateral portion (7) being integrally joined with the auxiliary continuous annular band.

In a 74th aspect according to any one of the preceding aspects, wherein the support (2) made of paper material sheet comprises a plurality of auxiliary containment structures (21).

In a 75th aspect according to any one of the preceding aspects, the plurality of auxiliary containment structures (21) is integrally made from a same flat paper material sheet.

In a 76th aspect according to any one of the preceding aspects, the auxiliary support (19) made of paper material sheet is made in one piece starting from a same flat paper material sheet, the auxiliary containment structure being made of the same flat paper material sheet.

In a 77th aspect according to any one of the preceding aspects, the ribs (25a) are at least 4, in particular at least 6 and even more particularly at least 8.

In a 78th aspect according to any one of the preceding aspects, the auxiliary support (19) is a paper sheet material with a grammage greater than a grammage of the sheet material constituting the container (8).

In a 79th aspect according to any one of the preceding aspects, the auxiliary support (19) is made of cardboard, in particular with a grammage of between 151 and 400 grams per m$^2$.

In an 80th aspect according to any one of the preceding aspects, the auxiliary support (19) comprises a predetermined number of weakening lines (15) configured to allow a separation of portions of the support from each other, in particular each portion comprising one or more, in particular only one, auxiliary containment structures (21).

In an 81st aspect according to any one of the preceding aspects, wherein the container (8) is removably coupled to the auxiliary top portion of the auxiliary containment structure (21).

In an 82nd aspect according to any one of the preceding aspects, the auxiliary upper edge (20) and/or the lateral wall

(10) of the container (8) are coupled, in particular removably, to the auxiliary top portion of the auxiliary containment structure (21).

In an 83rd aspect according to any one of the preceding aspects, the ribs (7a) of the containment structure (3) and the ribs (25a) of the auxiliary containment structure have an inclined pattern from the respective top portion to the respective bottom to define intersection areas of the ribs and a reticular structure.

In an 84th aspect according to any one of the preceding aspects, the support (2) and the auxiliary support (19) are joined together by a folding line (24).

BRIEF DESCRIPTION OF THE DRAWINGS

Further features and advantages will become apparent from the detailed description of a preferred but non-exclusive embodiment of a baking pan for cooking and distributing sweets and food in general according to the present invention, made hereinafter with reference to the accompanying drawings, provided for indicative, non-limiting purposes only, in which:

FIG. 1 is a perspective view of a baking pan having the subject structure;

FIG. 2 is top view of the baking pan in FIG. 1;

FIGS. 4a and 4b show respective sections of the baking pan according to vertical planes at the coupling zone between the container and the containment structure;

FIG. 6 shows a perspective view, partially from below, of a second embodiment of the baking pan according to the invention;

FIG. 7 shows a bottom photograph of a containment structure according to the invention of the type shown schematically and used in FIG. 6.

DETAILED DESCRIPTION OF EMBODIMENTS

Figure 3:
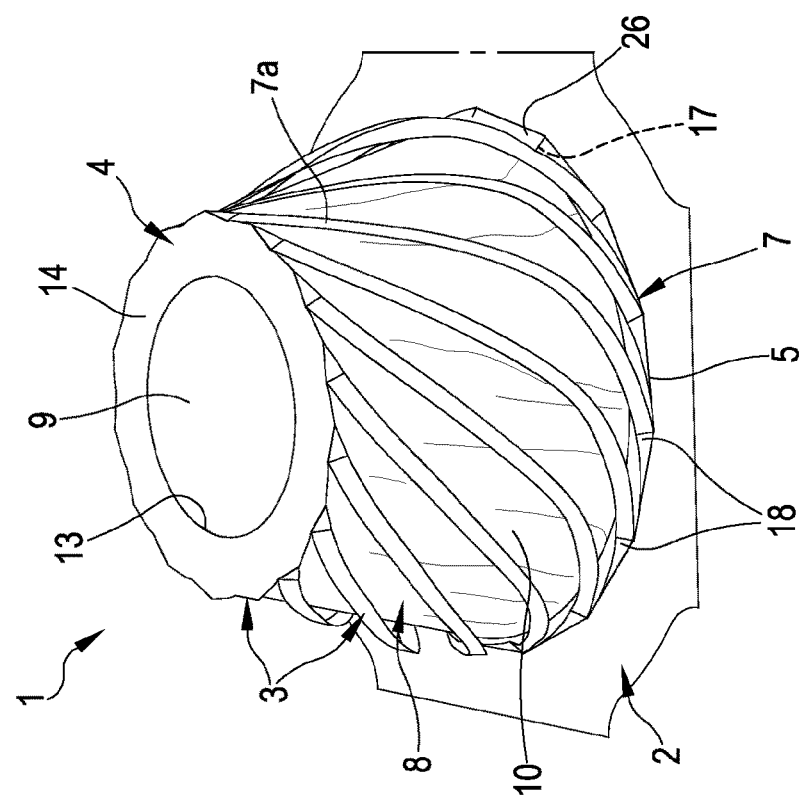
FIG. 3 is an enlarged view partially from below of the baking pan in FIG. 1.

With reference to the accompanying figures, and in particular to FIG. 1, reference numeral 1 generally indicates a baking pan having a structure according to the present invention. The baking pan 1 comprises at least two main elements made separately and then coupled: a support 2 having a laminar structure and made of paper material which has one or more containment structures 3, and a predetermined number of containers 8 made of paper material housed, one each, in containment structures 3. The containers 8 are made of paper sheet material starting from a flat sheet. The container 8 has a base 9, a lateral wall 10 emerging away from the base 9 and an upper edge 20 emerging from the lateral wall 10 so as to define a containment compartment designed to receive the food product, for example a suitable mixture (liquid or semi-liquid) to be cooked in the oven. As indicated, the container 8 is made integrally starting from a same material in paper sheet, so that the base 9, the lateral wall 10 and the upper edge 20 are monobloc and joined seamlessly. Precisely by virtue of the manufacturing process, the container 8 exhibits at the lateral wall 10 and upper edge 20, surpluses of paper material determined by making the container 8 by deformation/folding from the flat sheet. Depending on the type of container 8 intended to be made, the surpluses of material are in the form of a substantially regular pleating on the lateral wall 10 and on the upper edge 20, or the surpluses of material are in the form of irregular tri-layered crushed portions on lateral wall and upper edge (i.e. with three overlapping layers of paper, observing the section of the lateral wall/upper edge where the compensation folds of the surplus material are formed); obviously, it is also possible to form substantially regular pleating combinations and irregular tri-layered crushed portions. Non-limitingly, containers 8 shown in the exemplary figures show an upper edge 20 with regular pleating and a lateral wall 10 with irregular folds (see, for example, the photograph in FIG. 4). From a geometrical point of view, the container 8 has a substantially circular top edge 20, a substantially circular base 9 and a continuous lateral wall 10 with a substantially frusto-conical shape (as shown in the figures) or cylindrical shape. Of course, the possibility of other shapes for container 8, such as polygons or combinations of polygonal or round bases with round or polygonal top edges, is not excluded. It should also be noted that the figures attached to the application show containers which are substantially identical or very similar in terms of dimensions and geometry, however the baking pan could be configured to also receive different containers both in terms of dimensions and in geometrical terms. Moreover, the baking pan in the figures contains many containers 8, however, within the scope of the invention the situation of a single container 8 in the baking pan (of small or large size depending on the requirements) is also encompassed.

Figure 4:
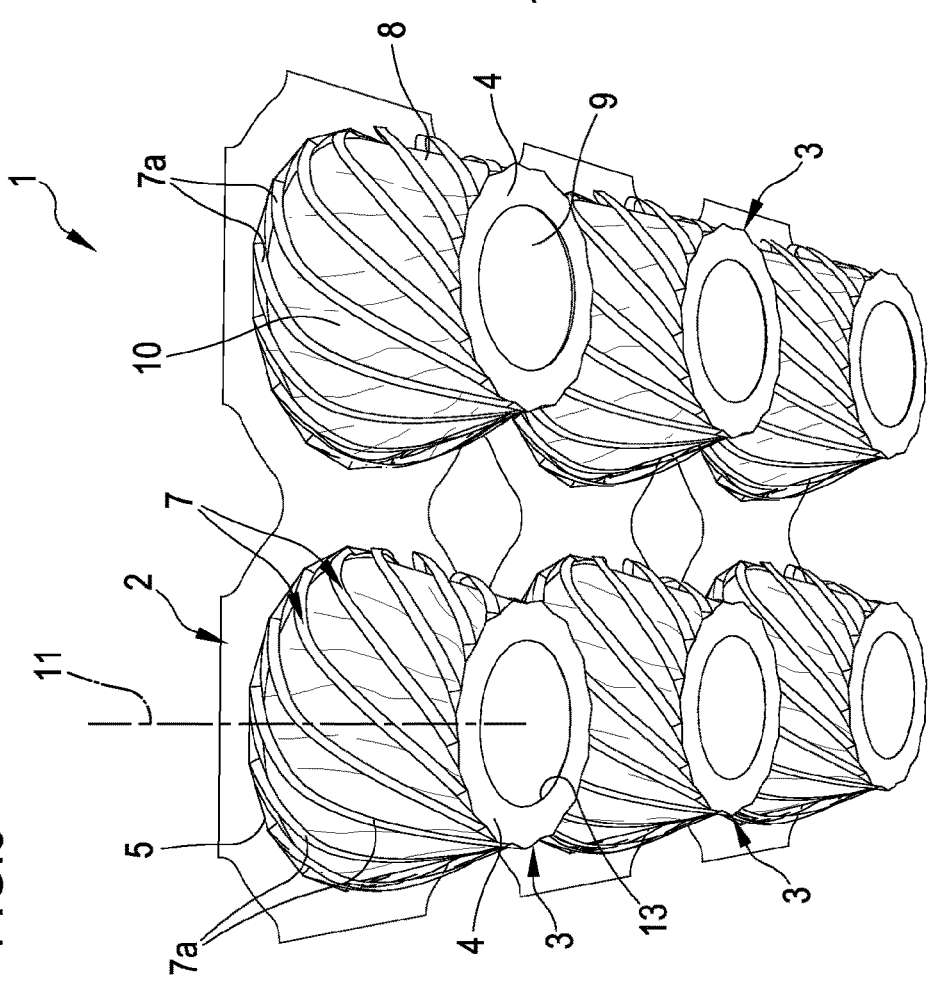
FIG. 4 is a bottom photograph of a containment structure according to the invention of the type shown schematically and used in FIG. 1.
Figure 5:
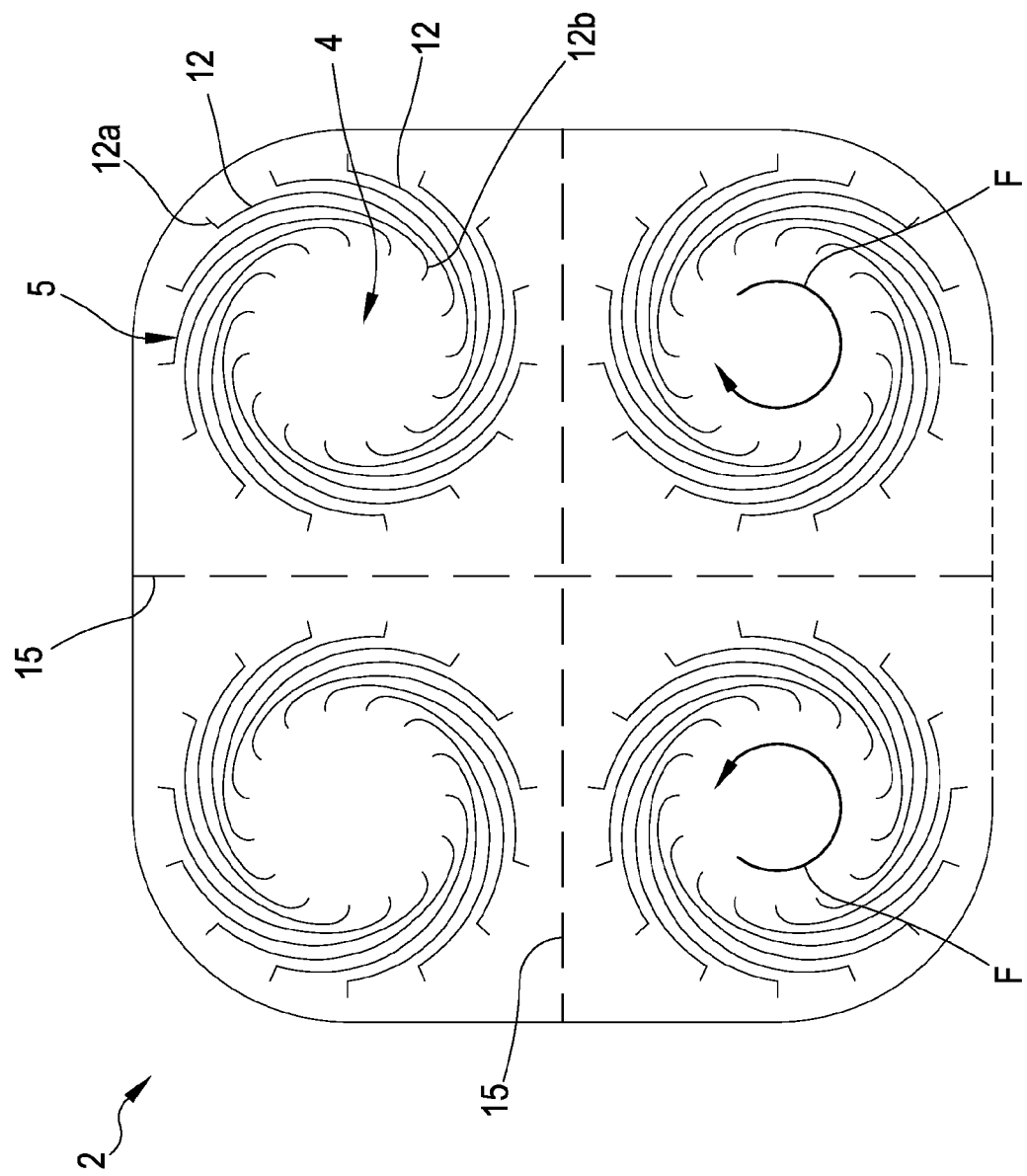
FIG. 5 is a plan view of a support before deformation to obtain the containment structure of the preceding figures.
Figure 8:
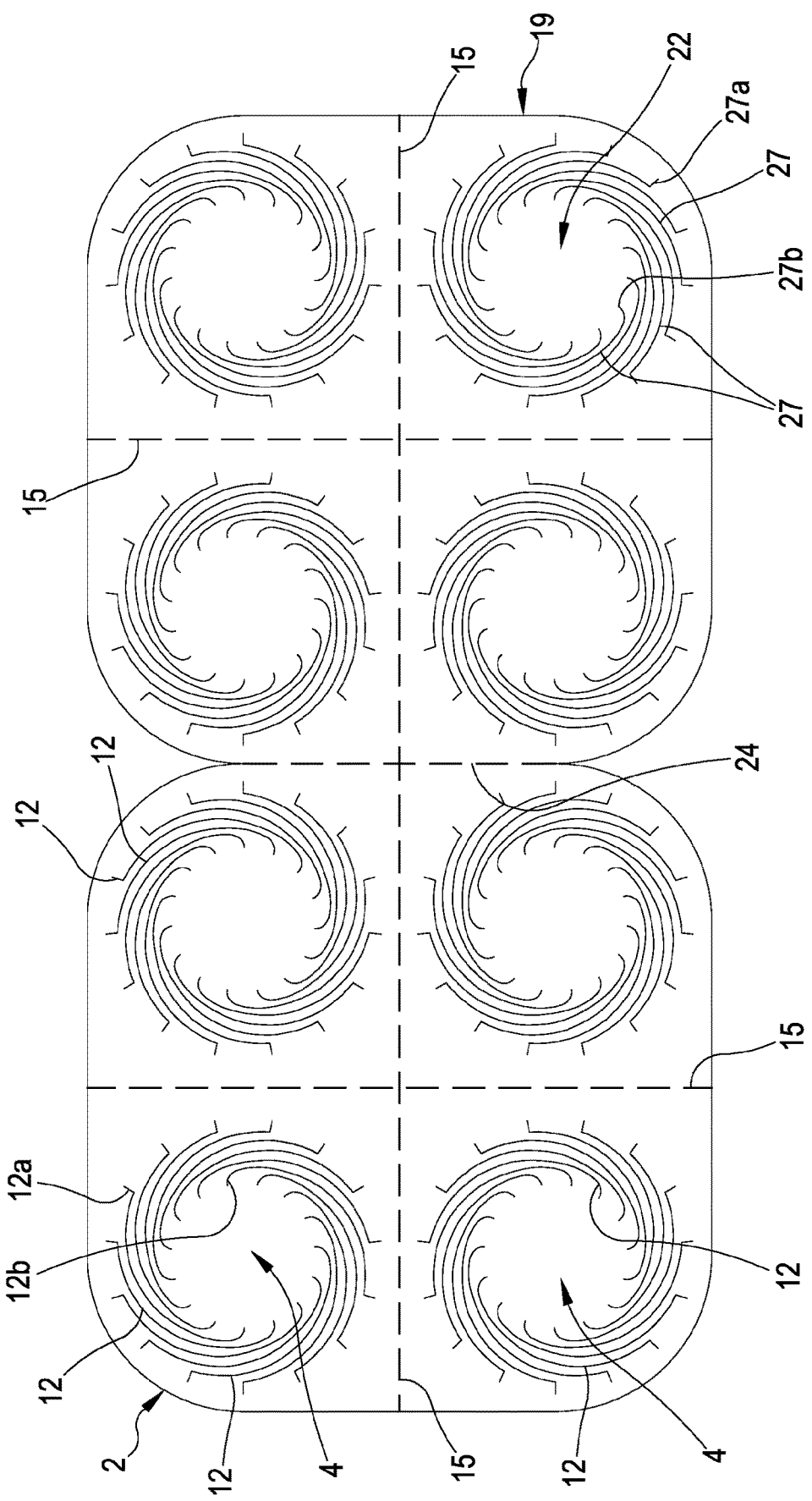
FIG. 8 is a plan view of a support and an auxiliary support joined together prior to the deformation to obtain the containment structure of the preceding FIGS. 6 and 7.

As can be seen in the accompanying figures, the container 8 exhibits the lateral wall 10 and the base as continuous surfaces without openings and/or interruptions of the structural continuity, in order to contain a dough without leaking it. Finally, it should be noted that the containers 8 adopted can provide rather low paper grammage and also a possible absence of plastic coating film or film of very reduced thicknesses since the structure of the baking pan is retained by different elements and the containers can only assume the function of containment of the food without any need to retain the structure (guaranteed by the support 2 by means of the containment structure 3). For example, papers with grammage of less than 100 $g/m^2$, in particular less than 80 $g/m^2$, and even less than 70 $g/m^2$ may be used (papers with grammage of between 45 and 65 $g/m^2$ may be suitable for the function in this invention). Returning now to the description of the support 2, the same comprises at least one (and in general a plurality) of containment structures 3, each having a bottom portion 4, a top portion 5 delimiting an insertion opening 6 (for the container 8) and a lateral portion 7 emerging from the bottom portion 4 and joined to the top portion 5. As for the container 8, also the containment structure 3 is integrally made from a same sheet of paper material, i.e. the bottom portion 4, the top portion 5 and the lateral portion 7 are integral and seamlessly joined. From the implementation point of view, the containment structure 3 is made by deformation starting from a flat paper material sheet of the type shown in FIG. 5. FIG. 5 shows a punched support 2 from a semi-finished product, for example unwound from a roll of paper material in roll; the support 2 shows 4 distinct areas provided with one or more curvilinear through cuts 12. The cuts 12 are arranged in an area of the support and are developed starting from a peripheral zone towards a central area of the flat paper material sheet. The same take a pattern that could be defined as spiral and surround a central area where the through cuts are interrupted, which will define, in baking conditions, the bottom portion 4 of the support structure 3, as better explained hereafter. The curvilinear through slots 12 define a plurality of curvilinear segments substantially parallel to each other with a clockwise or anticlockwise pattern around an axis 11 normal to a development of the central area (axis entering the sheet of FIG. 5); each through cut 12 defines a cut that is distinct and separated from the other cuts 12. Each cut 12 extends between a constraint end 12a and a bottom end 12b with an angular opening greater than 15°, in particular greater than 45°, even more particularly greater than 90°. In a specific embodiment, each through cut 12 substantially defines or approximates a circumferential arc. A relative rotation about the vertical axis 11 between the perimetric edge of the support 2 and the central area free of cuts 12, according to a direction opposite to that of the curvilinear segments, determines a corresponding departure of the central area from the perimetric edge of the support 2 in a direction parallel to the axis 11 (i.e. 0 outside the plane in FIG. 5) and a simultaneous arrangement of the paper material interposed between the through cuts 12 in three-dimensional configuration to define the ribs 7a of the support structure 2. In other words, by keeping the perimetric edge of the support fixed and rotating the central discs inside the cut area according to the direction indicated by the arrows F in FIG. 5, a transformation of support 2 from two-dimensional to three-dimensional is determined, assuming the configuration (for example) shown in FIG. 4 in which the containment structure 3 appears to be determined. From the above it is understood that it is possible to switch from a flat sheet to the three-dimensional structure of the containment structure 3 retaining the integrity of the support and without requiring separation and re-coupling operations of the parts. The support structure 3 is therefore in one piece and derives from a flat paper/cardboard sheet. As a further consequence, the (angular) extension of the through cuts 12 defines the length of the ribs 7a and consequently is proportional to a distance between the bottom portion 4 and the top portion 5. Moreover, the number of cuts 12 (in particular of the strips of material between the cuts) also defines the number of ribs 7a in the containment structure 3, which may be any number, but which will generally comprise at least 4, in particular at least 6 and even more particularly at least 8 ribs 7a. In fact, the lateral portion 7 of the containment structure 3 comprises a plurality of ribs 7a extending from the bottom portion 4 and joined to the top portion 5 for defining a lateral area of the containment structure 3 exhibiting through openings alternated by ribs 7a (see FIG. 4, for example). In the baking pan configuration, a container 8 is located inside each containing structure 3; the base 9 of the container 8 is substantially in contact or in proximity with the bottom portion 4 of the containment structure 3, the lateral wall 10 of the container 8 is substantially in contact or in proximity with the lateral portion 7 of the containment structure 3, and the upper edge 20 of the container 8 is substantially in contact or in proximity with the top portion 5 of the containment structure 3. As clarified and detailed hereafter, the container 8 is stably coupled to the top portion 5 of the containment structure 3. In summary, the containment structure 3, when decoupled from the container 8, can be configured between a three-dimensional condition in which the bottom portion 4 is spaced from the top portion 5 and a flat condition in which the bottom portion 4 is substantially aligned with the top portion 5 (as in FIG. 5); of course, the container 8 can be coupled to the containment structure only when the latter is in the three-dimensional condition. Moreover, the containment structure 8 may be configured between the three-dimensional condition and the flat condition by means of a relative rotation between the top portion 5 and the bottom portion 4 around an axis 11 normal to a development of the bottom portion 4. The bottom portion 4 according to the embodiment shown in FIGS. 1-4, has a central hole 13 which allows access (particularly to the heat during cooking) towards the base 9 of the container 8. This conformation determines that the bottom portion 4 comprises a continuous annular band 14 around the central hole 13 and that all the ribs 7a of the lateral portion 7 are integrally joined to the continuous annular band 14 in angularly (equally) spaced positions. Differently, FIG. 5 shows a support 2 in which the central areas do not exhibit any holes and therefore the support shown therein will give rise to a solid bottom portion (for example of the type then shown in FIGS. 6 and 7). Advantageously (but not necessarily), all the containment structures 3 are made in one piece starting from the same flat paper material sheet. In fact, the support 2 made of paper material sheet is made in one piece starting from a same flat paper material sheet, each containment structure being made of the same flat paper material sheet. As understandable, the support and the rigidity of the baking pan is entirely delegated to the support and to the containment structures, which however are not in charge of directly containing (coming into contact with) the food product. In this regard, the material constituting the support 2 may be a suitable cardboard, in particular with a grammage of between 151 and 400 grams per m². As can be understood, the support 2 is a paper sheet material with a grammage greater than the grammage of the paper sheet material constituting the container 8. The (removable) coupling between the container 8 and the support 2 is obtained mechanically by means of a pressing operation so that a portion of the container 8 "pinches" the support at the top portions 5 of the containment structure 3. Therefore the container 8 is removably coupled to the top portion 5 of the containment structure 3. In fact, the upper edge 20 and/or the lateral wall 10 of the container 8 are removably coupled to the top portion 5 of the containment structure 3. For this purpose and as shown schematically in the sections in FIGS. 4a and 4b, the upper edge 20 and/or the lateral wall 10 of the container 8 comprise a first segment 16 and a second segment 17 which are consecutive and transversal (in particular substantially parallel) to the top portion (5) of the containment structure 3. The first segment 16 will be placed above the top portion 5 of the containment structure 3 and the second segment 17 will be placed below the top portion 5 of the containment structure 3 oppositely to the first segment 16 for defining a stable interference fit between the container 8 and the containment structure 3. Observing the figures, it is noted that the upper edge 20 of the container 8 comprises (or coincides with) the first portion 16 abutted superiorly to the top portion 5 of the containment structure 3, while the lateral wall 10 of the container 8 comprises the second segment 17 abutted inferiorly to the top portion 5. The segments 16, 17 are immediately consecutive to each other so as to define a stable interference fit between the container 8 and the containment structure 3. In a section according to a vertical plane under conditions of normal use of the baking pan (FIGS. 4a and 4b), the first segment 16 and the second segment 17 define a substantially "U" pattern in which the top portion 5 of the containment structure 3 is housed and retained. First and second segments are defined by annular portions which extend throughout the circular development of the container, which in this way is stably coupled and supported. The consecutive folded sections extend circumferentially and substantially according to overlapping horizontal planes. As can be seen in FIGS. 4*a* and 4*b*, the lateral wall 10 of the container 8 also comprises a third segment 26 immediately consecutive to the second segment 17 oppositely to the first segment 16; the third segment is transversal, in particular also substantially parallel, to the top portion 5 of the containment structure 3. The coupling process between each container 8 and the respective containment structure 3 provides for housing the container 8 in the containment structure 3 so that the base 9 of the container 8 is in proximity of the bottom portion 4 of the containment structure 3, the lateral wall 10 of the container 8 is in the vicinity of the lateral portion 7 of the containment structure 3 and the upper edge 20 of the container 8 and in the vicinity of the top portion 5 of the containment structure 3. Then, by means of relative crushing, the distance between the upper edge 20 and the bottom portion 4 of the container (consequently also between the top portion 5 and the bottom portion 4 of the containment structure 3) is reduced so that a part of the lateral wall 10 deforms outwardly of the containment compartment of the container 8 below the top portion 5. The part of the deformed lateral wall 10 is then suitably crushed (pressed) against the top portion 5 to define an interference fit between the container 8 and the support structure 3. The deformation and crushing allow defining and arranging as described and shown the first, second and third segments 16, 17, 26. The crushed sections are also partly visible in the photograph in FIG. 4. It should be noted that the crushing operation to obtain the coupling of the container and containing structure also involves effects on the various ribs 7*a* which connect the base portion to the top portion of the structure itself. In particular, an upper segment 18 of each rib 7*a* remains crushed towards the top portion 5. This is clear both from the segment in FIG. 4*b* and from the photograph in FIG. 4. Advantageously, coupling the container 8 to the top portion 5 of the containment structure 3 while the base 9 of the container 8 is abutted to the bottom portion 13 allows keeping the three-dimensional structure of the containment 3 in a stable manner, preventing the base portion 9 from returning to the flat configuration aligned with the top portion 5. Moreover, the same coupling does not require other constraint operations (possible, but not necessary). In particular, the bottom portion 4 is not constrained (for example glued) to the base 9 of the container 8; in fact, the bottom portion 4 and the base 9 can rotate relative to each other. Likewise, the lateral wall 10 of the container 8 is not glued to the lateral portion 7 of the containment structure. Also the upper edge 20 is not constrained by glue or other irremovable means to the support 2. It should further be noted that the support 2 could comprise a predetermined number of weakening lines 15 configured to allow a separation of portions of the support from each other. In this way, it is possible to separate, for example during consumption, a food product from the others for a simpler transport/consumption. It should be noted that each portion in which the support can be divided may comprise one or more (although preferably only one) containment structures 3. FIG. 2 shows a situation in which the weakening lines 15 are such that the 4 containers on the right are individually separable, whereas the two left-most containers can be separated from the others together. Turning to FIGS. 6-8, a further embodiment is shown herein in which, in addition to the previously described elements which are present identical and which will therefore not be described again, the baking pan further comprises an auxiliary support 19 made of paper sheet material joined to the support 2. The auxiliary support 19 is very similar to the previously described support 2. In fact, the same serves to define at least an auxiliary containment structure 21 and in particular a number of auxiliary containment structures equal to the containment structures 3. The configuration of the auxiliary containment structure 21 is quite similar to that of the containment structure (with the exception of a feature highlighted below), in fact the same exhibits an auxiliary bottom portion 22, an auxiliary top portion delimiting an auxiliary insertion opening and an auxiliary lateral portion emerging from the auxiliary bottom portion 22 and connecting to the auxiliary top portion. Also the auxiliary containment structure 19 is integrally made starting from a same paper material sheet, i.e. the auxiliary bottom portion 22, the auxiliary top portion and the auxiliary lateral portion are joined together seamlessly. The auxiliary lateral portion of the auxiliary containment structure 21 comprises a plurality of ribs 25*a* extending from the auxiliary bottom portion 22 and joined to the auxiliary top portion for defining a lateral area of the auxiliary containment structure 21 exhibiting through openings alternated by ribs 25*a* The auxiliary containment structure 21 is inserted inside the containment structure 3 or vice versa. FIG. 8 shows a semi-finished product comprising the support 2 and the auxiliary support 19 connected along a folding line 24 the purpose whereof will be clarified below. As can be seen, the auxiliary support 19 is very similar to the support 2 and comprises curvilinear through cuts 27 which branch off from a constraint end 27*a* and end in a bottom end 27*b* for an angular opening greater than 15°, in particular greater than 45°, even more particularly greater than 90°. The auxiliary containment structure 21 is obtained equally by relative rotation of the central area of the support with respect to the perimetric edge. The difference with respect to the support 2 is that the through cuts 27 of an auxiliary containment structure 21 are wound in an opposite direction with respect to the through cuts 12 of the containment structure 3. This entails that the corresponding ribs 25*a* are directed with opposite winding direction with respect to that of the ribs 7*a*. In other words, the ribs 7*a* of the containment structure 3 and the ribs 25*a* of the auxiliary containment structure have an inclined pattern from the respective top portion to the respective bottom to define intersection areas of the ribs and a reticular structure (see photo in FIG. 7). From the point of view of the coupling of the container to the structures 2, 19, the process appears exactly the same since the container 8 is deformed and pressed so as to generate the aforementioned segments 16, 17 and 26 which will be arranged to "pinch" the top portion 5 and the auxiliary top portion within their U-shaped configuration. Of course, the pressing step will involve not only the crushing of the ribs 7*a*, but also that of the auxiliary ribs 25*a*. See FIG. 7. It should be noted that also in this case, no further operation of constraining the container to the auxiliary support structure 21 is needed and also no additional constraint between the support structure 2 and the auxiliary support structure 21. For example, the respective base portions 4 and 22 can freely rotate with each other. Finally, from the point of view of the production process, an appropriate arrangement of the patterns of the through cuts 12 and 27 allows making the support 2 and the auxiliary support 19 in line and also connected to one another. In fact, as shown in FIG. 8, when the two supports 2 and 19 are overlapped by bending them one on the other along the folding line 24, cuts 12 and 27 with an opposite pattern (clockwise vs. anticlockwise) are exactly one above the other. A single deformation operation will be sufficient to define the two containment structures 3, 21 since the base portion 4 will rotate according to a first direction and, correspondingly and simultaneously, the auxiliary base portion will rotate in the opposite direction. This makes the operations of making the baking pan according to FIGS. 6 and 7 extremely simple too.

The invention claimed is:

1. Baking pan for cooking food products in an oven, comprising:
   a support of paper sheet material having:
      at least one containment structure having a bottom portion, a top portion delimiting an inserting opening and a lateral portion emerging from the bottom portion and connected to the top portion, said containment structure being integrally made from a same paper sheet material, the bottom portion, the top portion and lateral portion being integrally seamlessly made,
   at least one container of a paper sheet material housed in the containment structure, the container having a base, a lateral wall emerging away from the base and an upper edge emerging from the lateral wall, the container being integrally made from a same paper sheet material, the base, the lateral wall and the upper edge being integrally seamlessly made,
      wherein the base of the container is in contact or in proximity with the bottom portion of the containment structure, the lateral wall of the container is in contact or in proximity with the lateral portion of the containment structure, the upper edge of the container is in contact or in proximity with the top portion of the containment structure,
   wherein the container is coupled with the top portion of the containment structure,
   and in that the lateral portion of the containment structure comprises a plurality of ribs extending from the bottom portion and joined to the top portion for defining a lateral area of the containment structure having through openings alternated by ribs, wherein the upper edge of the container comprises a first segment transversal to the top portion of the containment structure and the lateral wall of the container comprises a second segment transversal to the top portion of the containment structure, said segments being consecutive to each other, the first segment being placed above the top portion of the containment structure, the second segment being placed below the top portion of the containment structure oppositely to the first segment in order to define a stable interference fit between the container and the containment structure, in a cross-section according to a vertical plane in normal conditions of use of the baking pan, the first segment and the second segment define a "U" pattern inside which there is housed and held the top portion of the containment structure, an upper segment of each rib is crushed towards the top portion.

2. Baking pan according to claim 1, wherein the containment structure is made by deformation from a sheet of a flat paper material comprising one or more curvilinear through cuts from a peripheral area towards a central area of the flat paper material sheet, the curvilinear through cuts defining a plurality of curvilinear segments substantially parallel to each other, having a clockwise or anticlockwise pattern about an axis normal to a development of the bottom portion and wherein a relative rotation between the top portion and the bottom portion about an axis according to a direction opposite to the one of the pattern of the curvilinear segments, determines a departure of the bottom portion from the top portion along a direction parallel to the axis and a simultaneous placement of the material interposed between the through cuts with a three-dimensional configuration for defining the ribs, the extension of the through cuts defining the length of the ribs and consequently is proportional to a distance between the bottom portion and the top portion, each through cut defines a cut distinct and separated from the one of the other cuts extending between a constraint end and a bottom end with an angular expansion greater than 45°.

3. Baking pan according to claim 1, wherein the bottom portion is not constrained to the base of the container, the bottom portion and the base being configured to partly rotate with respect to each other.

4. Baking pan according to claim 1, wherein the bottom portion has a central hole to access the base of the container and at least one continuous annular band around the central hole, the ribs of the lateral portion being integrally joined to the continuous annular band.

5. Baking pan according to claim 1, wherein the support is of a paper sheet material having a grammage greater than a grammage of the paper sheet material forming the container, wherein the support is made of paperboard having a grammage comprised between 151 and 400 gr/m$^2$.

6. Baking pan according to claim 1, wherein the container is removably coupled to the top portion of the containment structure, the upper edge and/or the lateral wall of the container being coupled to the top portion of the containment structure.

7. Baking pan according to claim 1, wherein the lateral wall of the container comprises a third segment consecutive to the second segment oppositely to the first segment, said third segment being transversal to the top portion of the containment structure and wherein the first segment directly emerges from a free edge of the upper edge and is placed above the top portion oppositely to the bottom portion.

8. Baking pan according to claim 1, wherein the upper edge of the container comprises a first segment parallel to the top portion of the containment structure and the lateral wall of the container comprises a second segment parallel to the top portion of the containment structure, said segments being consecutive to each other, the first segment being placed above the top portion of the containment structure, the second segment being placed below the top portion of the containment structure oppositely to the first segment in order to define a stable interference fit between the container and the containment structure, in a cross-section according to a vertical plane in normal conditions of use of the baking pan, the first segment and the second segment define a "U" pattern inside which there is housed and held the top portion of the containment structure, an upper segment of each rib is crushed towards the top portion,
   wherein the lateral wall of the container comprises a third segment consecutive to the second segment oppositely to the first segment, said third segment being parallel to the top portion of the containment structure and wherein the first segment directly emerges from a free edge of the upper edge and is placed above the top portion oppositely to the bottom portion.

9. Baking pan according to claim 1, wherein the container has a circular upper edge, a circular base, and a continuous lateral wall having a frusto-conical or cylindrical shape,
   the continuous lateral wall and the circular base of the container do not have openings and interruptions of the structural continuity in order to contain a dough without leaking it, the upper edge, and an associated free edge of the upper edge, of the container, is disposed above the top portion of the containment structure oppositely to the base with respect to the top portion, the container comprises at the lateral wall and upper edge, surpluses of paper material determined by making the container by folding a flat sheet.

10. Baking pan according to claim 1, further comprising an auxiliary support of paper sheet material coupled to the support and having at least one auxiliary containment structure comprising an auxiliary bottom portion, an auxiliary top portion delimiting an auxiliary insertion opening and an auxiliary lateral portion emerging from the auxiliary bottom portion and connected to the auxiliary top portion, said auxiliary containment structure being integrally made from a same paper sheet material, the auxiliary bottom portion, the auxiliary top portion and the auxiliary lateral portion being integrally seamlessly joined to each other, the auxiliary lateral portion of the auxiliary containment structure comprising a plurality of ribs extending from the auxiliary bottom portion and joined to the auxiliary top portion for defining a lateral area of the auxiliary containment structure comprising through openings alternated with ribs, the auxiliary containment structure is inserted inside the containment structure or the containment structure is inserted inside the auxiliary containment structure.

11. Baking pan according to claim 10, wherein the through cuts of the auxiliary support and through cuts of the support, when the supports are coupled, define opposing patterns, clockwise and anticlockwise and wherein the ribs of the containment structure and the ribs of the auxiliary containment structure have an inclined pattern from the respective top portion to the respective bottom to define intersection areas of the ribs and a reticular structure.

12. Baking pan according to claim 1, wherein the top portion emerges transversely from the lateral portion and lies in a plane parallel to a plane which contains the bottom portion, each of the plurality of ribs emerges from the bottom portion and extends in an arched pattern up to the top portion.

13. Baking pan according to claim 12, wherein the top portion defines a top support plane and a continuous seamless edge surrounding the insertion opening, said continuous seamless edge being circular and developing in a plane, the lateral portion and the bottom portion of the containment structure, as well as the base and the lateral wall of the container developing below the top portion under conditions of use of the baking pan.

14. Baking pan according to claim 1, wherein each rib emerges from a point of the bottom portion and develops in an arched pattern up to a point of the top portion angularly offset with respect to said point of the bottom portion, wherein the bottom portion is circular and the insertion opening delimited by the top portion is circular.

15. Baking pan according to claim 6, wherein the coupling is a mechanical interference coupling between the container and the top portion of the containment structure, wherein the container has no openings at the lateral wall and the base, and the container is configured to contain semi-liquids food mixes for a subsequent cooking thereof.

16. Baking pan according to claim 6, wherein the coupling is a mechanical interference coupling between the top portion and the upper edge of the container.

17. Baking pan according to claim 1, wherein each rib is alternated with a through opening, ribs and through openings are arranged in a uniform manner along an entire development of the lateral portion.

18. Baking pan according to claim 1, wherein the containment structure, when decoupled from the container, is configurable between a three-dimensional condition in which the bottom portion is spaced from the top portion and a flat condition in which the bottom portion is aligned with the top portion, the container being coupled to the containment structure only when the latter is in the three-dimensional condition, and wherein the containment structure is configurable between the three-dimensional condition and the flat condition by means of a relative rotation between the top portion and the bottom portion around an axis normal to a development of the bottom portion.

19. Baking pan for cooking food products in an oven, comprising:

a support of cardboard sheet material having:
  a plurality of containment structures, each having a bottom portion, a top portion delimiting an inserting opening and a lateral portion emerging from the bottom portion and connected to the top portion, said plurality of containment structures being integrally made from a same flat paper material sheet, the bottom portion, the top portion and lateral portion being integrally seamlessly made,
a plurality of containers of a paper sheet material each housed in one of the containment structures, each container comprising a base, a lateral wall emerging away from the base and an upper edge emerging from the lateral wall, the container being integrally made from a same paper sheet material, the base, the lateral wall and the upper edge being integrally seamlessly made,
  wherein the base of the container is in contact or in proximity with the bottom portion of the containment structure, the lateral wall of the container is in contact or in proximity with the lateral portion of the containment structure, the upper edge of the container is in contact or in proximity with the top portion of the containment structure,
  wherein the container is removably and mechanically coupled with the top portion of the containment structure, the lateral portion of the containment structure comprising at least four ribs extending from the bottom portion and joined to the top portion for defining a lateral area of the containment structure having through openings alternated by ribs,
  wherein the container comprises a first segment and a second segment which are consecutive and transversal to the top portion of the containment structure, the first segment being placed above the top portion of the containment structure, the second segment being placed below the top portion of the containment structure oppositely to the first segment for defining a stable interference fit between the container and the containment structure, the first segment and the second segment defining a U-shaped pattern inside which the top portion of the containment structure is housed and retained, an upper segment of each rib is crushed towards the top portion.

* * * * *